A. M. GULAMERIAN.
LOCKING MASTER SWITCH FOR ELECTRIC SYSTEMS.
APPLICATION FILED AUG. 8, 1916.

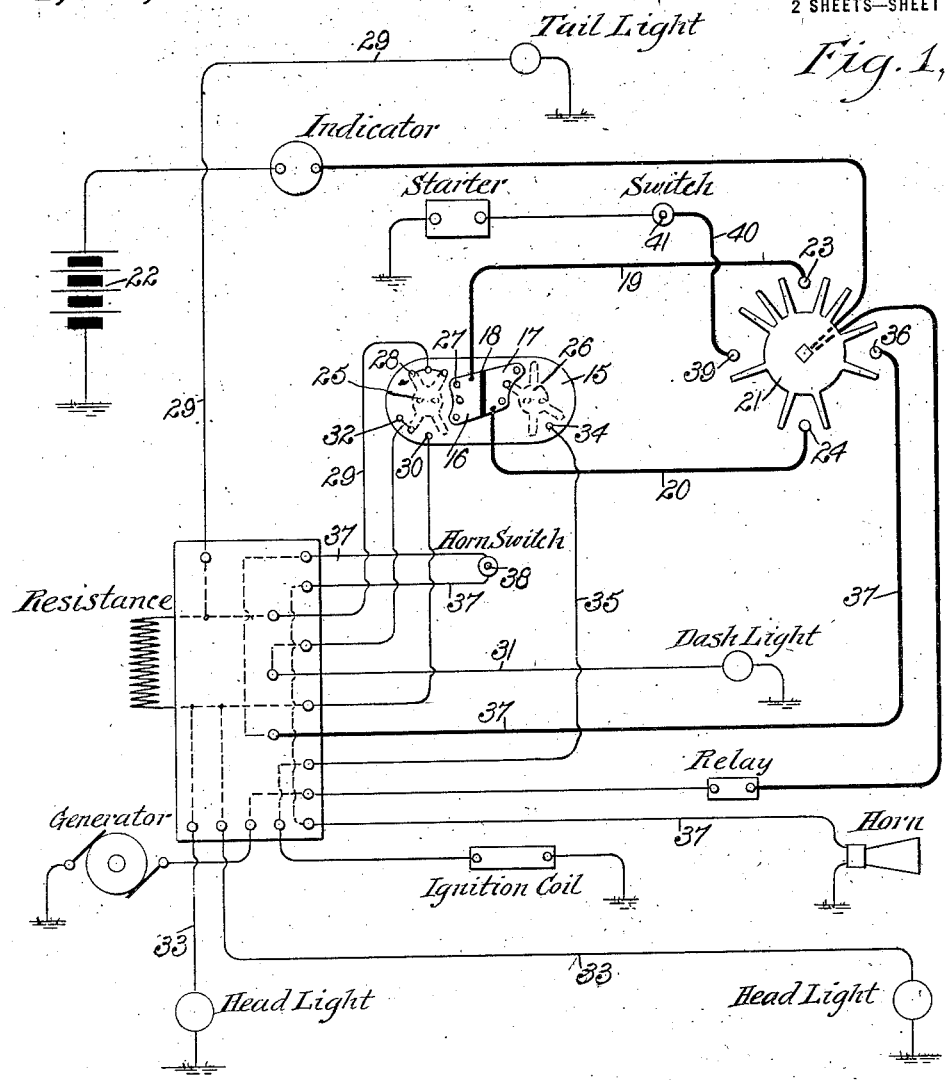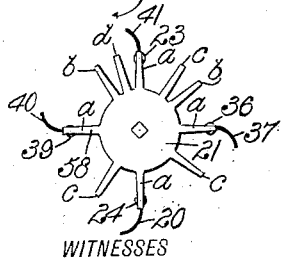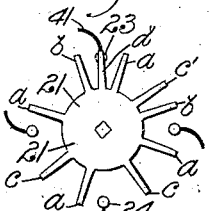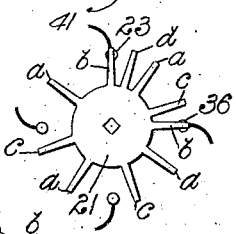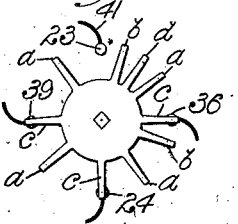

1,294,899.

Patented Feb. 18, 1919.
2 SHEETS—SHEET 2.

UNITED STATES PATENT OFFICE.

ARDASHES MUGRDICH GULAMERIAN, OF SUMMIT, NEW JERSEY.

LOCKING MASTER-SWITCH FOR ELECTRIC SYSTEMS.

1,294,899. Specification of Letters Patent. Patented Feb. 18, 1919.

Application filed August 8, 1916. Serial No. 113,687.

*To all whom it may concern:*

Be it known that I, ARDASHES M. GULA-MERIAN, a citizen of the United States, and a resident of Summit, in the county of Union and State of New Jersey, have invented a new and Improved Locking Master-Switch for Electric Systems, of which the following is a full, clear, and exact description.

Among the principal objects which the present invention has in view are: to provide a locking system for an electrically equipped motor-driven vehicle for selectively setting the system to permit the use of certain parts of the equipment and to prevent the use of the remainder thereof; and to provide means for operating several switches in groups.

Drawings.

Figure 1 is a diagrammatic view showing a layout of an electric wiring system and controls therefor wherein is incorporated the present invention;

Fig. 2 is a detail view showing a switch constructed and arranged in accordance with the present invention in active relation to all of the terminals of the wiring system of a vehicle, so disposed that the entire system may be freely employed;

Fig. 3 shows said switch in a position where only the lighting branch of the electric system is in service;

Fig. 4 shows the switch in position where the lighting branch and horn-sounding branch of the system are in service;

Fig. 5 shows the position of the switch wherein the horn-sounding branch, the electric starter branch, and the electric ignition branch are in service;

Fig. 6 shows the position of the switch when all of the branches of the electric system are not in service;

Figure 7:
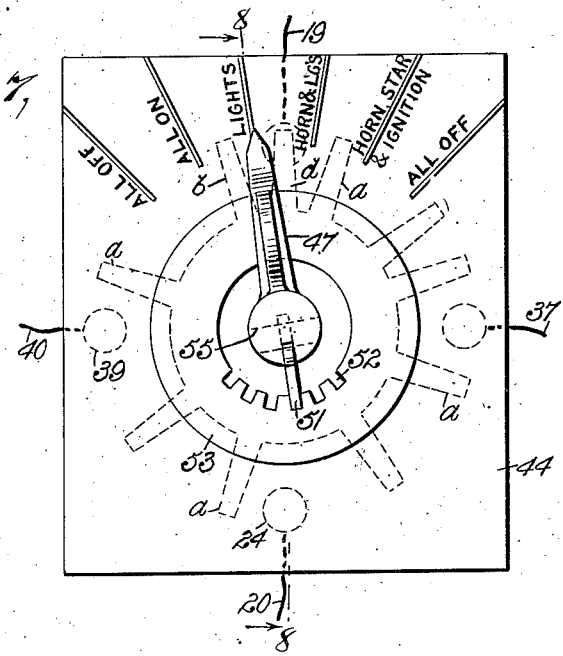
Fig. 7 is a detail view on an enlarged scale of the master switch employed in the present invention.

Description.

In Fig. 1 of the drawings distinction between the part of the wiring system necessary to the installation of the herein-disclosed master switch and the wiring of systems at present installed, is illustrated by the use of heavy lines to indicate the former and by light lines to indicate the latter. The switchboard 15 shown in the said figure is conventional in character with the exception that the plates 16 and 17 are employed instead of a single plate of similar shape and form. To prevent the flow of current between the plates 16 and 17, an insulated gap 18 is provided.

The two plates 16 and 17 are operatively connected by wire mains 19 and 20, with the master switch 21, and therethrough to the battery 22 when the said switch is moved to engage either of the terminals 23 or 24.

The switchboard 15 is constructed of suitable electric insulating material whereon is mounted the light-controlling switch 25 and the ignition switch 26. The switches 25 and 26 are employed, as are switches of conventional make, to be moved for producing various combinations of lights calling into use all of the three circuits usually provided on any group number thereof. Thus when the switch 25 is moved clockwise to engage the detent 27, the plate 16 is drawn in circuit with one of the group of terminals 28 of the branch "tail light" circuit having the wire 29. At the opposite side of the switch 25, one of the group of terminals 28 is connected with the terminals 30 and 32, the former placing in circuit the "head lights" and the latter the "dash light". When the said plate is moved one step farther in the same direction, the terminal previously engaged the detent 27 is moved to the next detent, while the companion terminal 28 passes to the end detent of the group controlling the "tail light". On the opposite side of the switch 25, one of the fingers is brought into contact with one of the terminals, 32, leaving the previously engaged terminal 30. In this position the circuit incorporating the "dash light" is completed and the circuits incorporating the "tail light" also. The "head lights" are in circuit through a "resistance" shown in the drawings, giving what is known as a "dimmer" circuit.

Referring back to the position shown in Fig. 1, if now the switch 25 be moved counterclockwise, it will be seen that the switch 25 will complete the circuit incorporating the plate 16, terminal 30, and one of the terminals of the group 28. Thus the car will be provided with a "tail light" and "head lights", the "dash light" being discontinued.

The movement of the switch 26 in either direction from the position shown in Fig. 1 of the drawings, operates to complete the circuit through the terminal 34, within which is incorporated the "ignition coil." The circuits incorporating the "horn" and "horn switch" are independent of the plates 16 and 17.

If during any of the shifts of the switch 25 above enumerated, the master switch 21 is in contact with the terminal 23, the battery 22 is in circuit with to supply the various lights referred to. On the contrary, if the master switch 21 is moved out of engagement with the terminal 23, none of the said lights will be supplied with current from the battery 22.

When the switch 26 is moved to engage the terminal 34, the said terminal is electrically connected with the plate 17 and the battery 22 supplies current to the "ignition coil" through the wire 35. If the switch 21 is not engaged with the terminal 24, the service of current from the battery 22 to the "ignition coil" is discontinued.

When the switch 21 is moved to engage the terminal 36, current is supplied from the battery 22 to the "horn", through the wires 37 whenever the manually-controlled switch 38 is closed.

When the switch 21 is moved to engage the terminal 39, current is supplied from the battery 22 through the wires 40 and manually-controlled switch 41, to the "starter." Reversely, when the switch 21 is not engaged with the terminal 39, service of current to the starter is discontinued.

Figure 8:
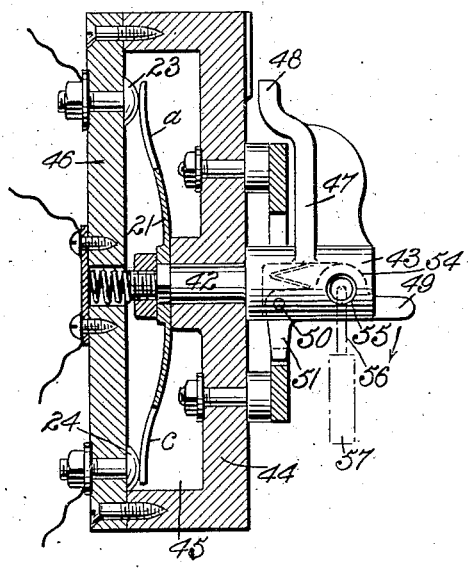
Fig. 8 is a section taken as on the line 8—8 in Fig. 7.

As best seen in Fig. 8 of the drawings, the switch 21 is rigidly held on a reduced end 42 of a switch block 43. The block 43 extends behind the outer surface of a switch casing 44, within a box-like chamber 45 wherein the switch 21 is mounted. The chamber 45 is formed in part by a bottom 46 in which the various terminals 23, 24, 36, and 39 are mounted. The block 43 has extended from one side thereof, a blade 47, the end whereof is shaped to form a pointer 48 for indicating in correspondence with the marking on the face of the casing 44, the position of the switch 21.

To lock the master switch in adjusted position, a lever 49 is pivoted by a pin 50 in a slot formed in the block 43. Laterally extended from the lever 49 is a tail-piece 51 adapted to extend into recesses 52 formed in the inner edge of a ring 53. The lever 49 has an extension pierced to register with a bore 55, through which extends the shackle 56 of a key-opened lock 57. When the lock 57 thus engages the lever 49, it is obvious that said lever may not be moved, and the block 43 cannot revolve to change the disposition of the switch 21.

The switch 21, as seen best in Figs. 2 to 6 inclusive, has a series of resilient fingers 58. The fingers 58 are disposed in groups to correspond with the combinations sought to be effected in the various needs incident to the manipulation of an automobile. Thus a series comprising the fingers $a$ is so arranged that when one of said series engages one of the terminals 23, 24, 36, 39, the remainder of said terminals are engaged by the other fingers of said series. A second group indicated by the letter $b$ is so arranged that when one of said fingers is engaged with the terminal 36, the other is engaged with the terminal 23. A third group indicated by the letter $c$ is so arranged that when one thereof engages the terminal 24, the others engages the terminals 36 and 39 respectively. The finger $d$ engages the terminal 23 when all the other fingers of the switch 21 are disengaged from any terminal.

Referring to Fig. 7 and to the indications on the casing 44 shown therein, the first position at the left of said figure, which reads "All off" corresponds with the position of the switch shown in Fig. 1 of the drawings.

If the lever is moved to place the tail-piece 51 in the "all off" corresponding with the "all off" position of the switch, and is locked, the automobile may be left knowing that it is impossible for a meddler to turn on the lights, ignition, sound the horn, or operate the starter, annoyances to which automobilists are now subjected. On the other hand, if the blade 47 is turned to the position marked "All on," the position of the fingers of the switch 21 is that shown in Fig. 2 of the drawings. The lock is seldom called into play when the switch is thus disposed as all of the controlling circuits are in force.

If at night the automobilist desires to leave the machine with the lights burning, he turns the blade 47 to register with the word "Lights," as shown in Fig. 7 of the drawings, when it will be found that the finger $d$ of the switch 21 engages the terminal 23 placing the plate 16 and lights controlled therefrom in circuit with the battery. If the block 43 is now locked in this position, the automobilist may leave the automobile without the annoyance of having the various devices, such as the horn, ignition coil, or starter interfered with.

If he desires to leave the automobile so that he may be called by use of the horn, the blade 47 is moved to register with the position indicated by "Horn & L'G'S," this position corresponding with the position of the switch 21 as shown in Fig. 4 of the drawings where the fingers $b$ engage the terminals 23 and 36, thus supplying current to the plate 16 and to the horn switch 38.

If the automobilist should desire to lock the machine in a position where the horn, starter and ignition are in service and lights cut out, the blade 47 is shifted to register with the marking indicating this on the casing 44, *i. e.*, "Horn, Star. & Ignition." The position assumed by the switch 21 is then that indicated in Fig. 5 of the drawings where the fingers $c$ engage the terminals 24, 36 and 39, and where the terminal 23 connected with the plate 16 is not engaged.

For convenience the "all off" position of the switch 21 is disposed at both ends of what may be termed the operating indication scale. This is provided merely that the automobilist may move the blade 47 to either end of the scale and lock the same at that position with the result that all of the fingers of the switch 21 will be disengaged from the various terminals above recited.

While I have hereinbefore described the master switch as employing a lock of a certain character, it will be understood that any suitable lock for securing the block 43 and switch 21 connected therewith in all of the positions above described may be employed.

*Claim.*

The combination of an electric source; a plurality of service switches, each having stationary contact terminals and a movable contact switch member; a master switch for controlling said service switches by placing same in circuit with said source at will, said master switch being operatively arranged for placing said electric source in circuit with the other switches simultaneously with the operating circuits incorporating the same and for placing said circuits in series with said electric source while disconnecting said other switches from said electric source; and a plurality of operating electric circuits, said operating circuits incorporating each, one of said stationary terminals, a responsive member, and a ground.

ARDASHES MUGRDICH GULAMERIAN.

Witnesses:
   MUGRDICH E. GULAMERIAN,
   GARABED M. GULAMERIAN,
   JOHN W. CLIFT.